US012800837B2

(12) United States Patent
Zhang et al.

(10) Patent No.: US 12,800,837 B2
(45) Date of Patent: Nov. 17, 2026

(54) TAP MONITOR FOR USE WITH OPTICAL POWER AND METHOD OF MAKING THE SAME

(71) Applicant: Lightel Technologies, Inc., Renton, WA (US)

(72) Inventors: Xiang Zhang, Renton, WA (US); Pai-Sheng Shen, Renton, WA (US)

(73) Assignee: Lightel Technologies, Inc., Renton, WA (US)

( * ) Notice: Subject to any disclaimer, the term of this patent is extended or adjusted under 35 U.S.C. 154(b) by 218 days.

(21) Appl. No.: 18/784,636

(22) Filed: Jul. 25, 2024

(65) Prior Publication Data

US 2026/0029582 A1 Jan. 29, 2026

(51) Int. Cl.
*G02B 6/28* (2006.01)
*G02B 6/036* (2006.01)

(52) U.S. Cl.
CPC ........... *G02B 6/2852* (2013.01); *G02B 6/036* (2013.01); *G02B 6/2821* (2013.01); *G02B 6/2843* (2013.01)

(58) Field of Classification Search
CPC ................ G02B 6/0208; G02B 6/2852; G02B 6/29317; G02B 6/29323; G02B 6/4287
See application file for complete search history.

(56) References Cited

U.S. PATENT DOCUMENTS

| | | | | |
|---|---|---|---|---|
| 4,089,584 | A * | 5/1978 | Polczynski | G02B 6/34 385/24 |
| 4,883,335 | A * | 11/1989 | Alferness | G02B 6/2821 385/48 |
| 5,166,992 | A * | 11/1992 | Cassidy | G02B 6/29332 385/24 |
| 6,249,626 | B1 * | 6/2001 | Bergmann | G02B 6/4286 385/48 |
| 6,690,505 | B1 * | 2/2004 | Ye | H01S 3/1003 359/337 |
| 6,807,001 | B1 * | 10/2004 | Ranka | H04B 10/07 359/334 |
| 7,123,836 | B2 * | 10/2006 | Lemoff | H04B 10/278 398/58 |
| 9,188,744 | B1 * | 11/2015 | Peng | G02B 6/29361 |
| 10,514,506 | B2 * | 12/2019 | Brusberg | G02B 6/2852 |
| 11,061,188 | B1 * | 7/2021 | Geng | G02B 6/2835 |
| 2003/0081902 | A1 * | 5/2003 | Blauvelt | G02B 6/1228 385/39 |
| 2007/0212006 | A1 * | 9/2007 | Wysocki | G02B 6/04 385/115 |
| 2024/0241318 | A1 * | 7/2024 | Geoffrion | G02B 6/024 |

* cited by examiner

Primary Examiner — Daniel Petkovsek
(74) *Attorney, Agent, or Firm* — J. H. Lin Patent Law P.C

(57) ABSTRACT

The present invention is generally related to a tap monitor use for a high-power pump and signal laser system capable of conveying up to several kilowatts. The present invention is related to a method to tap out small amount of the signal light in the system without disturbing the original signal transmission.

12 Claims, 5 Drawing Sheets

TAP MONITOR FOR USE WITH OPTICAL POWER AND METHOD OF MAKING THE SAME

TECHNICAL FIELD

This invention relates to an optical fiber tap monitor. In particular, it relates to a monitor to tap out a small amount of light in a high-power system, especially in a multi-clad fiber system. The monitor of the tap port could be controlled to obtain different power levels of the light from the main fiber.

BACKGROUND

Advanced optical fibers laser systems have more and more power output than before and are widely used in many industrial lasers applications. In particular, fiber lasers have been improved in their design and are now capable of showing actual output power in real time. In the past, some sensors were put near the splice location to monitor any power change from the splice point to determine failure alarms in the system. The measurement using this way sometimes didn't work properly, especially if the splice is too good to have any leak at this splice point. And also, this method cannot measure where the extra light come from when some signal light reflects from the output port. Another way to monitor the power is using a fused coupler or a fused splitter. A fused coupler normally taps out the power in the cladding if the fiber is a double cladding fiber and the system is a multi-mode pump system. If a coupler can tap out signal power, normally the fiber inside the coupler must be at very small diameter to let signal in the core to come out. That will degrade the beam quality and there will be limitation of the signal and pump power through the coupler. A stable, in-line, passive power monitor are expected by many laser system designers for many years. The high-power tap monitor in this invention not only can measure the signal power without deform the main fiber that may change beam quality, but also can measure the forward and backward signal power. The backward signal is from reflection by outside objects in real applications, which might damage the pump and seed sources. Most of time, the reflected power level could be used to trigger on/off of the electric power to protect the system.

DETAILED DESCRIPTION

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that the description of the present disclosure is thorough and complete and will fully convey the scope of the present disclosure to those skilled in the art. In the description below, details of well-known features and techniques may be omitted to avoid unnecessarily obscuring the presented embodiments and implementations.

When the signal light propagates in a fiber, the signal light is in the core. However, the system may exist splice points from fiber to fiber, some signal may transmit in the fiber cladding due to mis-alignment. Some signal light may leak to fiber cladding due to bending of the fiber. Some signal light may come from combiners, from FBG, or from the imperfect fiber itself. This phenomenon may be utilized to extract this light from the main output fiber by fusing a section of the fiber with its large main system fiber. The deeper of this section of fiber fuses into a main fiber, the more light is gotten from the main fiber. By the experiment, the tap monitor of this invention successfully tap out power from a 20/400 um double cladding main fiber in a 1000 W system without degrading the beam quality.

The fused technology is used to melt two or more fibers together to make a tap monitor in this invention. By controlling how much portions of tap port fiber melt into the main fiber, different levels of light may be provided into the tap monitor. This tap monitor may be connected at laser output port and measure the system power and beam quality.

As a result, no beam quality degradation may be found in the system.

The tap port fiber used may be a double clad fiber or a coreless fiber or a single clad fiber. Normally the light collected might have both pump power and signal power. To distinguish the signal power, a signal pass filter is used to remove the pump power from the fiber. Now the output tap port only consists the required light at specified wavelength.

Figure 9:
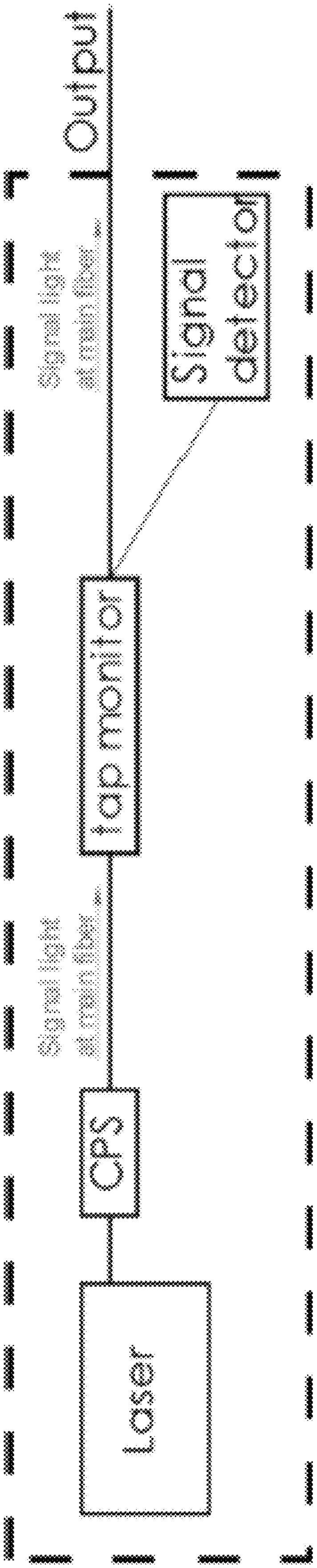
FIG. 9 is a diagram of a layout of a tap monitor in a system.

With a tap monitor sample constructed based on above principle and connected into a 1000 W laser system, the output of system power and tap power may be measured and their correlation may be compared. FIG. 9 is a layout of how this tap monitor may be used in the system. One cladding power stripper (CPS) may be used to prevent too much residual pump power in the cladding or too much signal power reflected from the output port which most of them travel in the cladding of the fiber.

Figure 1:
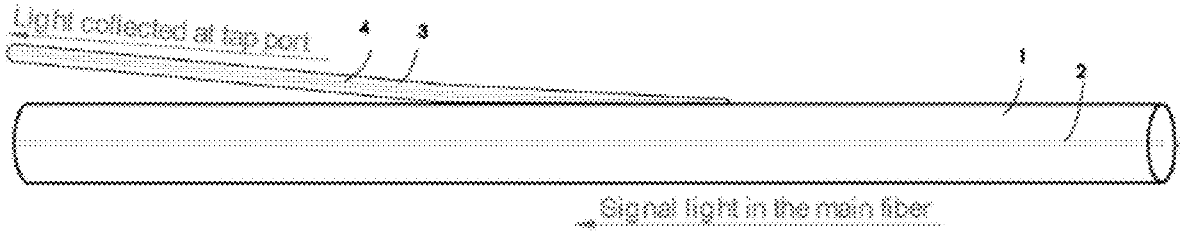
FIG. 1 is a representation of illustrating fabrication of fused fiber bundle having a main fiber 1 and a tapered fiber 3 as tap port. The core of main fiber 1 is 2, the core of the tap port fiber 3 is 4. The signal light propagates from right to left in the main fiber. The tap port receives some light in the tap port.
Figure 2:
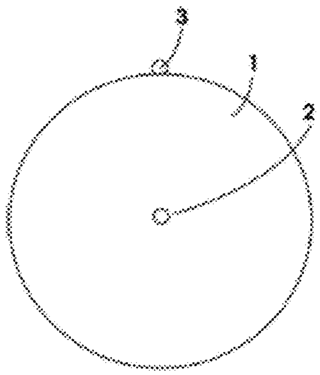
FIG. 2 is a cross-sectional side view of the fusion profile of a main fiber 1 and a tap port fiber 3 in accordance with this invention. 2 is the core of main fiber 1.
Figure 3:
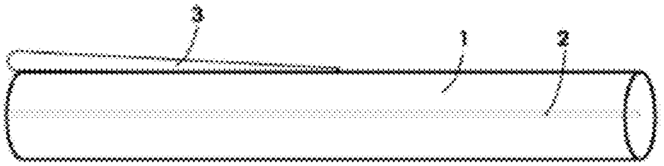
FIG. 3 is a representation of illustrating fabrication of a fused fiber bundle of a main fiber 1 and a tap port fiber 3. The tap port fiber 3 is fused attached on the surface of the main fiber 1. This structure shows tap port fiber 3 will get a small amount of the light from main fiber 1.
Figure 10:
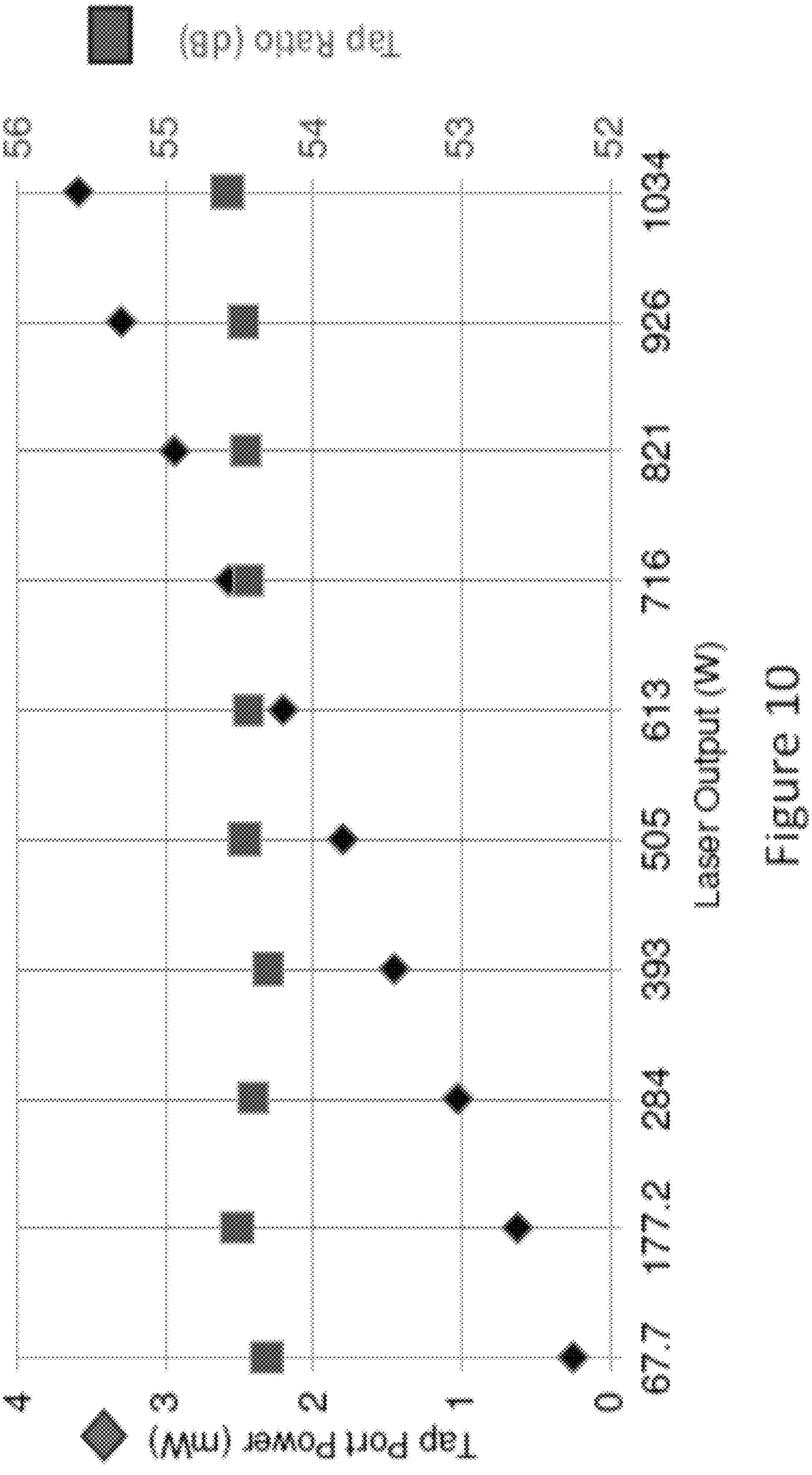
FIG. 10 is a diagram showing laser output in Watts (W) versus tap port power in milli-Watt (mW).

Based on a tap monitor made per FIG. 3 configuration, Table 1 shows the power in the tap port fiber 3 vs power in the main fiber 1. The main fiber is 20/400 um double cladding fiber, and the tap port uses 105/125 um fiber. The tap port power is after a filter which only allow signal power pass through. The ratio of tap power vs main fiber power is almost linear correlation, see FIG. 10.

TABLE 1

| Laser Output (W) | Tap Port Power (mW) | Tap Ratio (dB) |
|---|---|---|
| 67.7 | 0.2504 | 54.32 |
| 177.2 | 0.6257 | 54.52 |
| 284 | 1.0284 | 54.41 |
| 393 | 1.4575 | 54.31 |
| 505 | 1.8046 | 54.47 |
| 613 | 2.206 | 54.44 |
| 716 | 2.578 | 54.44 |
| 821 | 2.9428 | 54.46 |
| 926 | 3.304 | 54.48 |
| 1034 | 3.591 | 54.59 |

Figure 4:
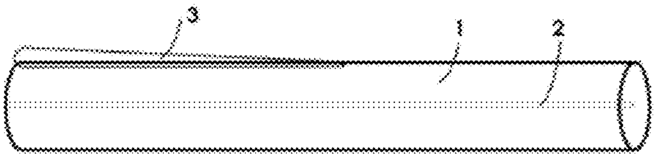
FIG. 4 is a representation of illustrating fabrication of a fused fiber bundle of a main fiber 1 and a tap port fiber 3. The tap port fiber 3 is fused and embedded into the main fiber 1. This structure shows tap port fiber 3 will get more amount of the light from main fiber 1.
Figure 5:
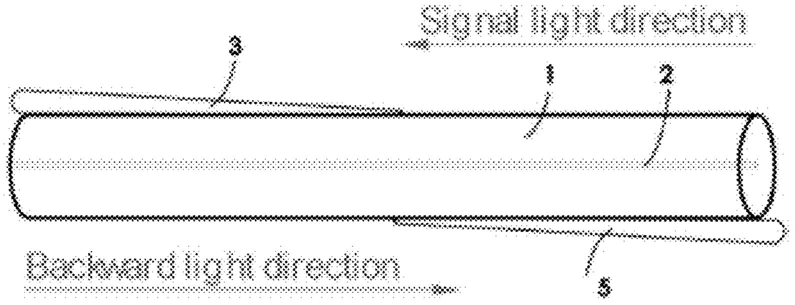
FIG. 5 is a representation of illustrating fabrication of a fused fiber bundle of a main fiber 1, a tap port fiber 3, and a tap port fiber 5. This structure can get light power at two opposite directions to monitor backward signal power reflected by the object in a real application.
Figure 6:
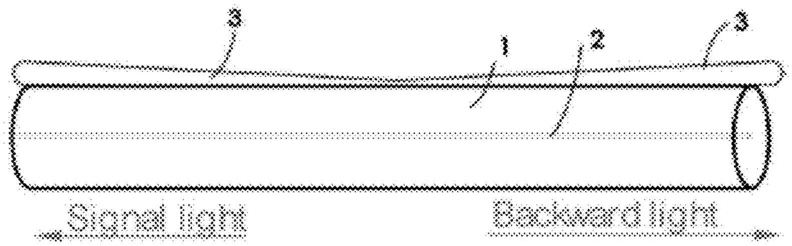
FIG. 6 is a representation of illustrating fabrication of a fused fiber bundle of a main fiber 1 and a tap port fiber 3. The tap port Fiber 3 has a two-output pigtail. This structure can tap out light power at two opposite directions to monitor system power and backward signal power reflected by the object in the application.
Figure 7:
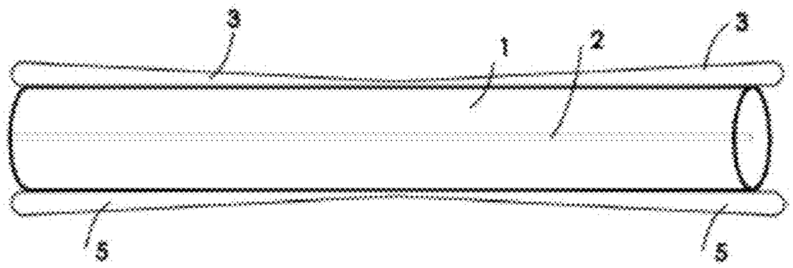
FIG. 7 is a representation of illustrating fabrication of a fused fiber bundle of a main fiber 1, a tap port fiber 3, and a tap port fiber 5. The tap port Fiber 3 and the tap port fiber 5 each has a two-output pigtail. This structure not only can get light power at two opposite directions, but also can separate two wavelengths at same direction by using different wavelength filter at each output at same time.
Figure 8:
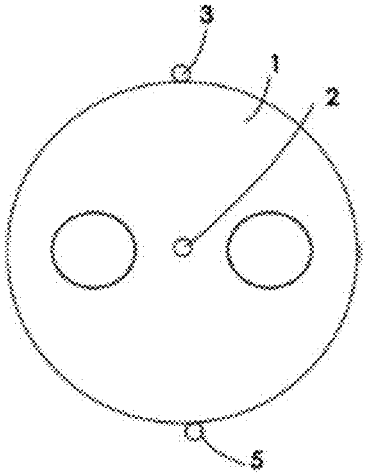
FIG. 8 is a cross-sectional side view of a fused fiber bundle of a main fiber 1, a tap port fiber 3, and a tap port fiber 5. The main fiber 1 is a PM fiber. The tap port fibers 3 and 5 can collect polarized signal light at same time. By using a polarizer, two orthogonal polarization signal light may be analyzed at fiber 3 and fiber 5, respectively.
Figure 11:
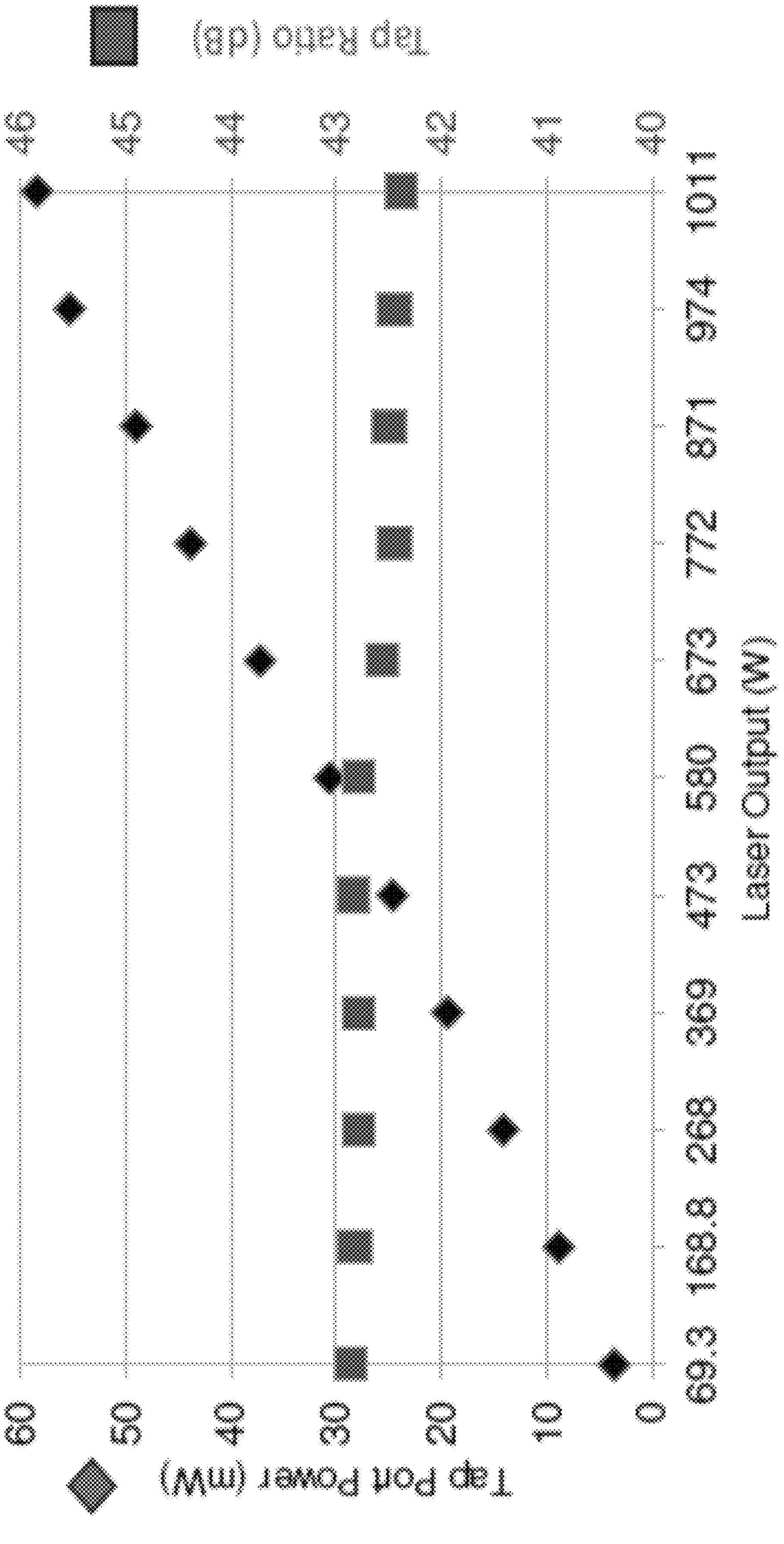
FIG. 11 is a diagram of showing laser output in Watts (W) versus tap port power in milli-Watt (mW).

FIG. 4 shows another tap monitor configuration based on which more power may be obtained from main fiber 1. Table 2 is the power in the tap port fiber 3 vs power in the main fiber 1. The main fiber is 20/400 um double cladding fiber, the tap port use 105/125 um fiber. The tap port power is after a filter which only allow signal power pass through. The ratio of tap power vs main fiber power is almost linear correlation, see FIG. 11.

TABLE 2

| Laser Output (W) | Tap Port Power (mW) | Tap Ratio (dB) |
|---|---|---|
| 69.3 | 3.585 | 42.86 |
| 168.8 | 8.823 | 42.82 |
| 268 | 14.108 | 42.79 |
| 369 | 19.39 | 42.79 |
| 473 | 24.61 | 42.84 |
| 580 | 30.57 | 42.78 |
| 673 | 37.26 | 42.57 |
| 772 | 43.89 | 42.45 |
| 871 | 49.03 | 42.5 |
| 974 | 55.378 | 42.45 |
| 1011 | 58.43 | 42.38 |

What is claimed is:

1. A high-power tap monitor, comprising:

a main fiber that is a section of an optical fiber configured to propagate light;

one or more tap port fibers comprising optical fibers configured to capture light from the main fiber at both forward and backward directions simultaneously; and a signal detector that receives the captured light at both forward and backward directions from the one or more tap port fibers.

2. The tap monitor of claim 1, wherein the main fiber comprises a stripped section of a coated fiber for a fusing or adhesive process.

3. The tap monitor of claim 1, wherein the one or more tap port fibers are pre-tapered, twined, or parallel touched with the main fiber to form a tap monitor.

4. The tap monitor of claim 1, wherein the one or more tap port fibers comprise one or more tapered fibers that are fused or adhered with the main fiber.

5. The tap monitor of claim 1, wherein the one or more tap port fibers capture the light from the main fiber.

6. The tap monitor of claim 1, wherein the main fiber comprises a multi-clad fiber.

7. The tap monitor of claim 1, wherein the main fiber comprises a polarization maintaining fiber.

8. The tap monitor of claim 1, wherein the one or more tap port fibers comprise one or more double cladding fibers, one or more coreless fibers, or one or more single clad fibers.

9. The tap monitor of claim 1, wherein the one or more tap port fibers capture light of both a pump and a signal light from the main fiber.

10. The tap monitor of claim 1, wherein the light captured from the main fiber at the backward direction comprises light reflected from an object outside of the main fiber.

11. The tap monitor of claim 1, wherein the signal detector is configured to measure both forward and backward signal power in the main fiber.

12. The tap monitor of claim 1, wherein the optical fibers of the one or more tap port fibers are configured to capture light from the main fiber's cladding.

* * * * *